UNITED STATES PATENT OFFICE.

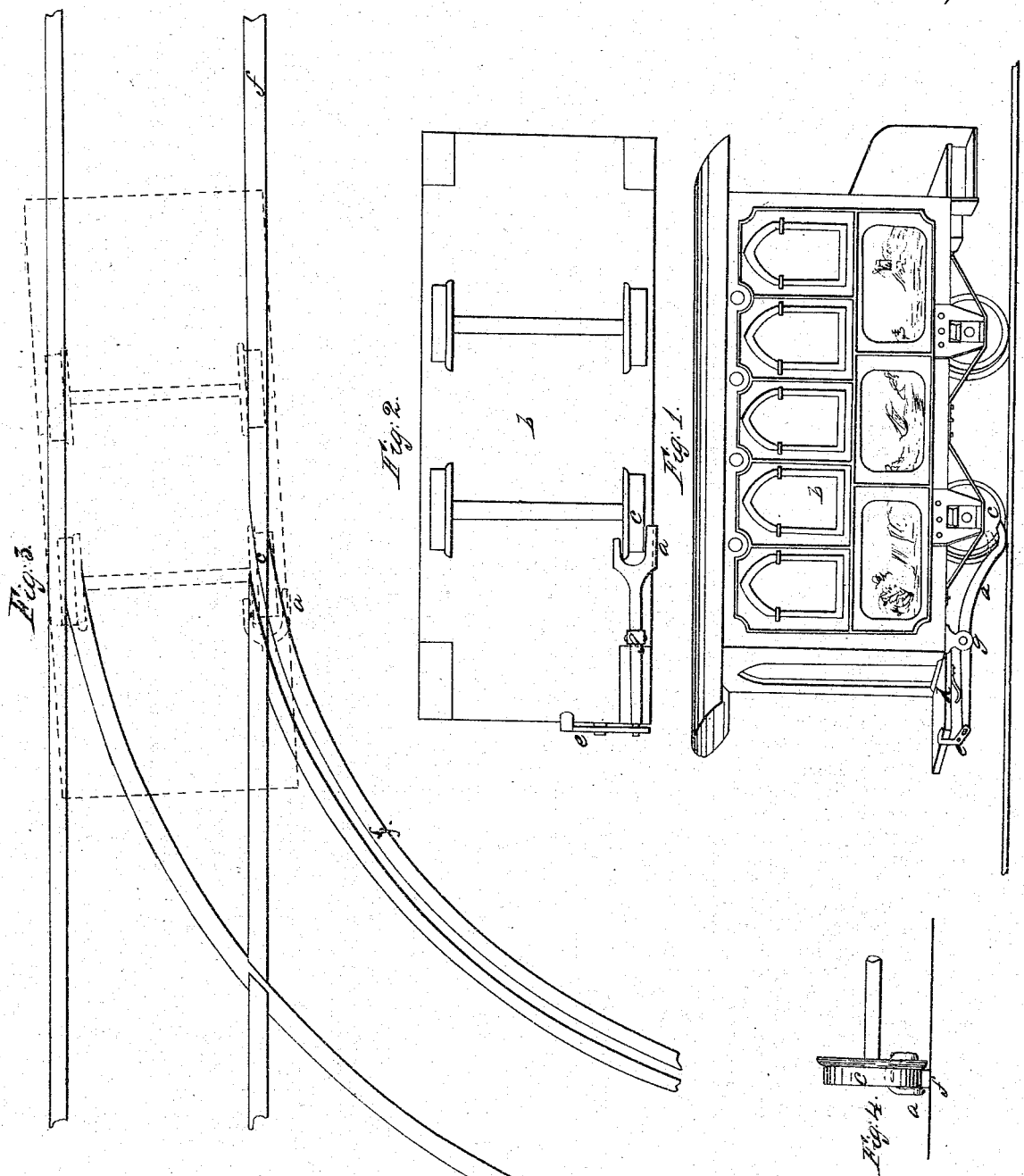

JOSEPH E. TYNAN, OF PATERSON, NEW JERSEY.

IMPROVEMENT IN SWITCHING CAR-TRUCKS.

Specification forming part of Letters Patent No. 43,353, dated June 28, 1864.

*To all whom it may concern:*

Be it known that I, JOSEPH E. TYNAN, of Paterson, Passaic county, and State of New Jersey, have invented a new and Improved Self-Switching Car-Truck for City Railways; and I do declare that the fol'owing is a full and exact description thereof, reference being had to the accompanying drawin_s and letters of reference marked thereon.

The nature of my invention consists in the switching of city-railway cars around curves or onto sidings without the aid of a switch or switch-tender, the same being accomplished by means of a lever, to be hereinafter more particularly described, which the driver or conductor presses with his foot on approaching a curve or siding over which he wishes to carry his car.

The following description will show the construction and operation of my invention.

Figure 1 represents the invention applied to an ordinary city-railway car, in which A represents the self-switching apparatus, a forked-shaped lever extending on each side of the wheel. (Shown by the dotted lines.) G is the fulcrum on which the lever works, which when not in use is thrown up clear of the track by means of a spring, D. This lever is operated by the bent lever E, a part of which projects above the platform of the car, which may be depressed by the driver placing his foot upon it, when the guide portion of the lever will fall outside the rail, and if near a curve the car will be carried in its direction.

Fig. 2 represents a vertical view of the truck, showing the manner in which the forked-shaped lever is applied, the short arm of the fork on the inside of the wheel serving the purpose of distributing the strain or pressure upon the outer arm of the fork.

Fig. 3 represents the truck about passing a curve on the ordinary city-railroad track, *f*. The lever A, being thrown down, is represented as in operation, confining the wheel to the track, and therefore following the curve.

Fig. 4 is an end view of the forked lever applied to the wheel, showing the manner in which it acts as a substitute for a double-flanged wheel, and thus confining the wheel to the track.

What I claim as my invention, and desire to secure by Letters Patent, is—

The lever A, or its equivalent, as shown and described, when applied to city-railway car trucks for the purpose of switching such cars from a straight track around curves or onto other tracks or sidings.

JOSEPH E. TYNAN.

Witnesses:
LAWRENCE HOLMS, JR.,
GEO. W. HENDERSON.